United States Patent [19]

Appeldorn

[11] 4,237,493
[45] Dec. 2, 1980

[54] TELEVISION SUPPORT AND PICTURE PROJECTOR

[75] Inventor: Roger H. Appeldorn, White Bear Lake, Minn.

[73] Assignee: Minnesota Mining and Manufacturing Company, St. Paul, Minn.

[21] Appl. No.: 953,617

[22] Filed: Oct. 23, 1978

[51] Int. Cl.³ .......................... H04N 5/74; H04N 5/64; G03B 21/00; H05K 5/00
[52] U.S. Cl. .................................. 358/237; 358/250; 358/254; 353/119; 353/122; 312/7 TV
[58] Field of Search .................... 358/237, 236, 254; 353/171, 164, 181, 119, 121, 122, 98; 350/211; 312/7 TV

[56] References Cited

U.S. PATENT DOCUMENTS

| | | | |
|---|---|---|---|
| 3,558,209 | 1/1971 | Trufanoff et al. | 350/211 |
| 3,943,282 | 3/1976 | Muntz | 358/237 |
| 4,021,105 | 5/1977 | Schubach | 358/237 |
| 4,058,837 | 11/1977 | Muntz | 358/237 |

*Primary Examiner*—Robert L. Griffin
*Assistant Examiner*—Edward L. Coles
*Attorney, Agent, or Firm*—Cruzan Alexander; Donald M. Sell; John C. Barnes

[57] ABSTRACT

A projection television set is afforded by the use of a stand for the television set which permits the television set to be rotated on a horizontal axis to position the screen downward toward a projection lens having an odd number of mirrors to direct an image toward a remote screen without necessitating any rewiring of the television set.

5 Claims, 3 Drawing Figures

TELEVISION SUPPORT AND PICTURE PROJECTOR

BACKGROUND OF THE INVENTION

1. Field of the Invention

This invention pertains to large screen or projection television and in one aspect is directed to a stand for a television set which permits the normal viewing of the television set or the projection of the image from the television screen onto a remote screen for viewing.

2. Description of the Prior Art

Projection television is provided generally by directing the images produced by the cathode ray tubes toward a remote screen which will illuminate the screen to produce the image. Additionally, projection lenses have been utilized in alignment with the television screen to project the image developing on the conventional phosphorus television screen onto a remote screen or wall. In using the normal television set, however, with a barrel-type projection lens, it is necessary that the television set be rewired such that the image on the television screen will be reversed for projection as a right reading image on the wall. This means that if a television is rewired for remote viewing it cannot then be viewed in the normal fashion because the image will be reversed.

SUMMARY OF THE PRESENT INVENTION

The present invention provides a unique support for a television set permitting the set to be viewed normally but yet permitting the image from the television set to be projected onto a remote screen. The support for the television comprises a frame which has at least a pair of transversely spaced vertical upright members which have lower supports to support the frame from the floor and means for supporting a television set adjacent the upper ends thereof. The support means for the television set permits the set to be pivoted such that the screen of the television may be moved from a generally vertical normal viewing position to a generally horizontal position with the screen beneath the television set. The support also supports a projection lens which includes an odd number of mirrors or specular reflectors such that the image from the screen may be projected to the remote screen in a right reading manner.

BRIEF DESCRIPTION OF THE ACCOMPANYING DRAWING

The present invention will be more fully described with reference to the accompanying drawing wherein.

DETAILED DESCRIPTION OF THE PRESENT INVENTION

Figure 1:
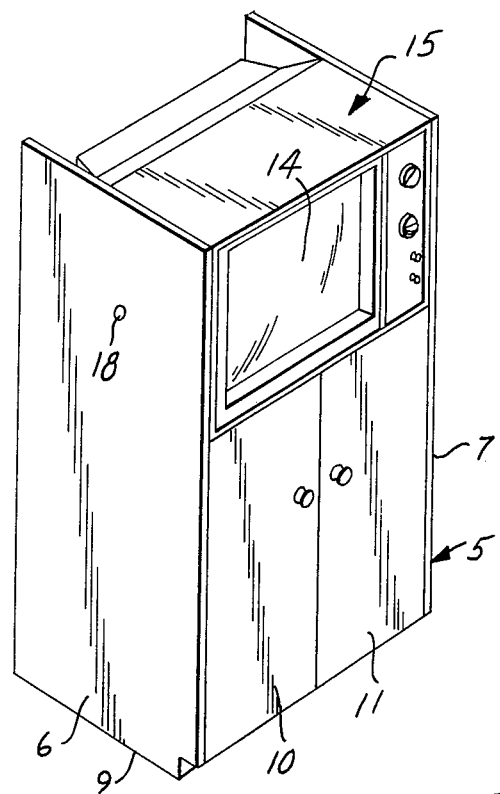
FIG. 1 is a perspective view of a television support structure and a television set constructed in accordance with the present invention.

The present invention relates to a support or television cabinet which will permit the normal viewing of a television set and which will permit the projection of the image from the television screen to a remote screen in enlarged form.

The support of the present invention is illustrated in the drawing and comprises a cabinet 5 having a pair of spaced parallel verical side wall members 6 and 7 and a connecting rear wall member 8. The vertical wall members 6 and 7 are each provided with a lower base or support area 9 which is adapted to rest on the floor. It is to be understood however that the support member may have different esthetic designs to provide various styles of cabinetry. The illustrated cabinet also includes a pair of doors 10 and 11 covering the front of the cabinet and extending transversely between the wall members 6 and 7. The doors 10 and 11 are conventionally hinged along their opposite edges to the wall members 6 and 7 to permit the same to swing open and expose the interior of the cabinet 5.

Figure 2:
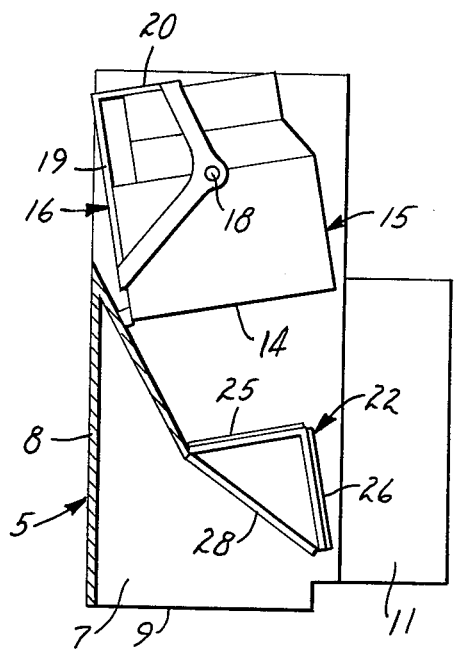
FIG. 2 is a vertical sectional view of the support of FIG. 1.

Supported for pivotal movement in the upper part of the cabinet is a television set generally designated by the reference numeral 15. This television set 15 has a screen 14 with a diagonal measurement of any conventional size, e.g., from 13" to 19" as desired, to fit the size of the cabinet. Means are provided for supporting the television for movement from a first position as shown in FIG. 1, with the screen disposed generally vertically for normal viewing, to a second position with the screen 14 disposed generally horizontally below the television set as shown in FIG. 2. Thus, the image is directed downwardly. The means for supporting the television set comprises a shelf-like frame 16 which is pivotally mounted between the wall members 6 and 7 on trunions 18. The shelf-like frame 16 comprises a base 19 with a back wall 20 and the television set 15 is secured to the frame 16 by suitable fastening means. In the normal viewing position as shown in FIG. 1 the television set 15 is supported with the screen 14 positioned to be viewed normally and the controls manipulated conveniently. The doors 10 and 11 can be opened and the television set moved to the second position with the screen disposed in a direction toward the floor. In this position the image from the screen will be projected to a remote screen.

The projection system for projecting the image from the screen 14 of the television to a remote screen comprises a projection lens assembly generally designated by the reference numeral 22.

The projection lens assembly 22 takes the image from the screen and projects the same in a right reading manner to the remote screen 23. The projection lens assembly 22 comprises a pair of lens elements and an odd number of mirrors such that the projected image from the screen of the television is right reading on the screen 23 upon shifting of the television 15 from the normal viewing position of FIG. 1 to the position shown in FIG. 2. The projection lens assembly comprises a pair of positive echelon-type lenses having a plurality of light refracting facets formed by circular grooves with a groove frequency of for example three grooves per millimeter, or 75 grooves per inch, and the lenses can be formed from an acrylic material. The lenses 25 and 26 are angularly positioned with respect to each other and are aligned on an optic axis with a specular reflector or mirror 28 disposed at an angle to the lenses 25 and 26 to reflect the light along the optical axis of said lenses.

Figure 3:
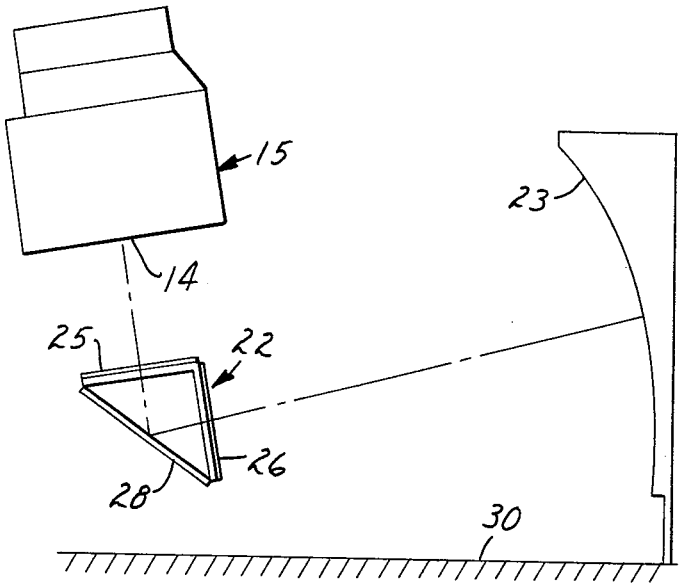
FIG. 3 is a diagramatic view of the television projection system utilizing the support of the present invention.

As illustrated in FIG. 3 the screen 23 is mounted to have a vertical angle to reduce keystoning of the image, and is curved to reduce effects of field curvature induced by the projection lens. However it is also satisfactory to project the image from the screen 14 onto a wall or flat screen having no curvature which was tilted slightly toward the projector.

Examples of two lenses and the magnification offered thereby together with the dimensions of the system are reproduced below. The dimension A is the dimension between the screen 14 of the television set and the lens 25, and the dimension B is the dimension between the lens 26 and the remote screen 23 along the projection axis. In the illustrated example, in FIG. 3 the projection lens assembly 22 is approximately a 10 inch (or 25 cm) cube, using lenses 10" by 10" square, with the television set positioned at a maximum height of approximately 4 feet (122 cm) above the floor 30.

The table for a lens assembly 22 having an effective focal length of 324 mm, a 203 mm aperature at F 1.6 with a lens separation of 254 mm, ±1.5 mm, to project an image on the screen 23 with a diagonal measurement of approximately 50 inches (1270 mm) is as follows:

| TV SCREEN | MAGNIF. | DIM.-A | DIM.-B |
|---|---|---|---|
| 13" DIAG. | 3.8 × | 10.0" | 51.6" (4'-4") |
| 15" DIAG | 3.3 × | 10.5" | 45.2" (3'-9") |
| 17" DIAG. | 2.9 × | 11.0" | 40.1" (3'-4") |
| 19" DIAG. | 2.6 × | 11.5" | 36.3" (3'-0") |

For a lens assembly 22 with an effective focal length of 510 mm with a 303 mm lens aperture at F 1.7, with a lens separation of 254 mm, ±1.5 mm, to have a projection image with a diagonal measurement of approximately 50" the following table would apply:

| TV SCREEN | MAGNIF. | DIM. - A | DIM. - B |
|---|---|---|---|
| 13" DIAG. | 3.8 × | 19.3" | 90.3" (7'-6") |
| 15" DIAG. | 3.3 × | 20.1" | 80.3" (6'-8") |
| 17" DIAG. | 2.9 × | 20.9" | 72.2" (6'-0") |
| 19" DIAG. | 2.6 × | 21.7" | 66.2" (5'-6") |

Having thus described the present invention it will be appreciated that the structure of the television support system for supporting the television set and the projection lens may vary without departing from the scope or spirit of the present invention as defined by the appended claims.

What is claimed is:

1. A television support and picture projection structure comprising
    a frame having a pair of transversely spaced vertical members, each with a lower support area,
    means on said members for pivotally supporting a television set for movement from a first position with the screen disposed generally vertically to a second position with the screen disposed below the set and generally horizontally, and
    projection lens means, supported by said members and disposed below said means for supporting a television set and between said means for supporting a television set and said lower support areas, for projecting an image from said screen when a said television set is in said second position to a remote screen.

2. A television support according to claim 1 wherein said projection lens means comprises an odd number of specular reflectors.

3. A television support according to claim 1 wherein said projection lens means comprises a pair of angularly positioned positive eschelon lenses and a specular reflector, said reflector being positioned optically between said lenses and at an angle thereto such that light entering one said lens along its optic axis is reflected therefrom along the optic axis of the other lens and through said other lens.

4. A television support according to claim 1 wherein said projection lens means comprises a pair of angularly positioned positive eschelon lenses and a specular reflector, said reflector being positioned optically between said lenses and at an angle thereto such that light entering one said lens along its optic axis is reflected from said reflector directly at and along the optic axis through said other lens, said pair of lenses constituting an f/1.6 lens having an effective focal length of 324 millimeters.

5. A television support according to claim 1 wherein said projection lens means comprises a pair of angularly positioned positive eschelon lenses and a specular reflector, said reflector being positioned optically between said lenses and at an angle thereto such that light entering one said lens along its optic axis is reflected from said reflector directly at and along the optic axis through said other lens, said pair of lenses constituting an f/1.7 lens having an effective focal length of 510 millimeters.

* * * * *